United States Patent [19]

Shiber

[11] 4,364,229

[45] Dec. 21, 1982

[54] AUTOMOTIVE ENERGY MANAGING TRANSMISSION

[75] Inventor: Samuel Shiber, Mundelein, Ill.

[73] Assignee: Timetz, Ltd., Holon, Israel

[21] Appl. No.: 235,977

[22] Filed: Feb. 19, 1981

[51] Int. Cl.³ .................. F16D 31/00; F16H 39/08; F15B 1/02
[52] U.S. Cl. .................................... 60/414; 60/437; 60/490
[58] Field of Search ................ 60/413, 414, 435, 437, 60/487, 490; 74/687

[56] References Cited

U.S. PATENT DOCUMENTS

| 3,905,251 | 9/1975 | Greene | 60/437 X |
|---|---|---|---|
| 4,037,409 | 7/1977 | Leibach | 60/437 X |
| 4,098,144 | 7/1978 | Besel | 60/437 X |
| 4,175,389 | 11/1979 | Shiber | 60/414 |

Primary Examiner—Robert G. Nilson
Attorney, Agent, or Firm—Samuel Shiber

[57] ABSTRACT

An automotive energy managing transmission comprising a differential for splitting the power to mechanical and hydrostatic branches. The transmission is adapted to operate in several modes: hydrostatic in the city, hydromechanical and mechanical on the highway, regenerative braking and engine starting. The transmission includes an energy storage means and allows the engine to operate intermittently during city driving.

6 Claims, 1 Drawing Figure

AUTOMOTIVE ENERGY MANAGING TRANSMISSION

This application shows an improvement to the system described in my U.S. Pat. No. 4,223,532 issued on Sept. 23, 1980.

Due to the limited supply of gasoline and its corresponding high cost, the importance of minimizing fuel waste in vehicles has taken new dimensions in recent years.

Presently automobiles waste fuel in several ways, some of which are:

1. During braking the vehicle's kinetic energy is transformed to wasted heat.
2. When moving in congested traffic, the engine operates very inefficiently and is running continuously even when the vehicle is standing.
3. Present transmissions usually have a few fixed ratios vs. an infinitely variable transmission which can continuously provide an optimal ratio. Further, present day automatic transmissions introduce additional power losses in the torque converter and hydraulic pump areas.

The object of the present system is to provide a system which will eliminate the above and other inefficiencies.

The advantages of regenerative braking, intermittent engine operation at an optimal speed and an infinitely variable transmission, as well as the value of these features to the fuel economy of a vehicle, are all known. However, to date, no system has been built that would provide these features without introducing undesirable and intolerable side effects of cost, complexity and bulk.

SUMMARY OF THE PRESENT INVENTION

The present invention relates to a hydromechanical/hydrostatic automotive power transmission which is adapted to incorporate regenerative braking and intermittent optimal engine operation in one simple, compact, light and inexpensive hardware package.

The transmission is adapted to operate in several modes in order to maximize fuel economy in various driving conditions: over the highway the transmission provides a direct mechanical drive (lock-up); when descending a long incline it operates in over-drive; in the suburbs the transmission is in hydromechanical modes; and in stop-and-go traffic the transmission is fully hydrostatic, enabling the engine to operate optimally and intermittently, charging an accumulator and shutting itself off until the accumulator is almost depleted, at which point the transmission restarts the engine which recharges the accumulator, etc.

During braking the transmission efficiently converts the vehicle's kinetic energy to pressurized fluid stored in the accumulator, to be reused for reaccelerating the vehicle or for some other needed auxiliary function.

While all the above features and their fuel saving value is well established in the industry, as mentioned previously, the unique aspect of this design is that it achieves all these goals without introducing unacceptable side effects of complexity, cost or bulk. On the contrary, it provides all these features with a system the hardware of which is substantially simpler than present day automatic transmissions. Further, the present system eliminates the conventional starting system, part of the braking system, it does the majority of actual braking and it allows a substantial reduction in engine's size.

It can also be noted that the two hydraulic units, which are combined in a unique way to form the transmission, are similar to conventional piston pumps and motors. Thus, the present design does not require any unproven or non-existing technology or manufacturing processes. (The term "hydraulic unit," throughout this application shall mean a device comprising two members rotatable one relative to the other as a result of, or as a cause of, pressurized fluid flow through the device. In the first instance the device acts as a motor and in the second instance it acts as a pump. One member of the device shall be designated "input/output member," in view of the hydraulic unit's duplicate function, as a pump and a motor, and the other member which is anchored to the housing of the transmission shall be designated a "reaction member.")

The control is preferably based on an electronic micro-processor to translate driver's inputs through the brake, accelerator and gear shift levers to optimal setting of the transmission and engine elements.

DETAILED DESCRIPTION OF THE DRAWING

Figure 1:
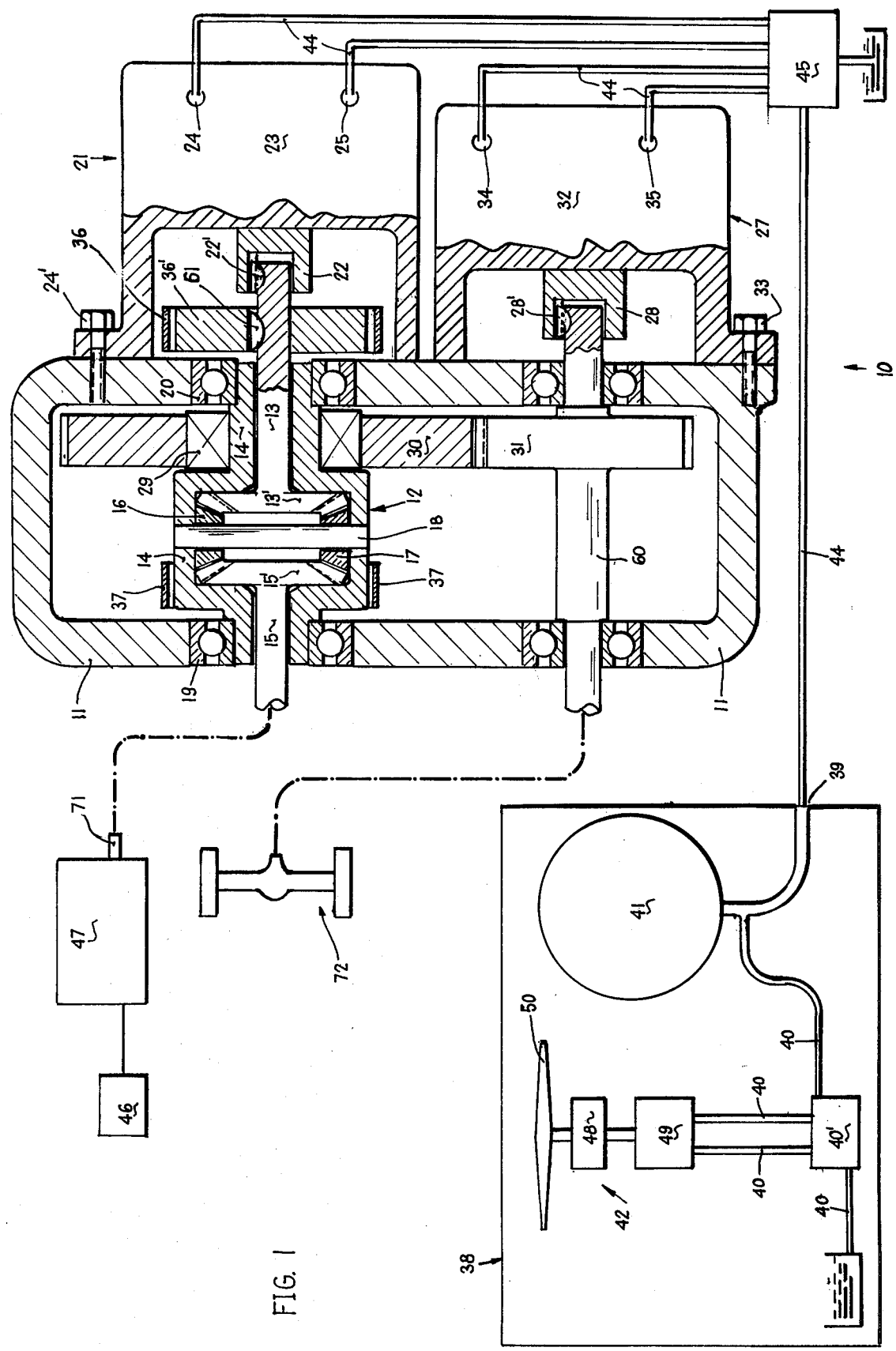
FIG. 1 is a schematic cross sectional view of an embodiment of the present invention.

FIG. 1 shows an automotive energy managing Transmission 10, comprising: A housing 11, a differential 12 having a first, a second and a third input/output shaft 13, 14 and 15 respectively. The differential 12 is of the type commonly used in the rear axle of cars, having two side bevel gears, 13' and 15', and two pinion bevel gears, 16 and 17 which are rotately supported on a shaft 18 and are carried by the differential casing which also serves as the second output shaft 14. The gears 13', 15', 16 and 17 are preferably helical.

Shafts 13 and 15 are rotatably supported by the shaft 14 which is in turn rotatably supported by the housing 11 through ball bearings 19 and 20.

A first hydraulic unit 21 having a first input/output member 22 coupled to the first input/output shaft 13 by a key 22', a first reaction member 23 attached to the housing 11 by bolts 24' (one shown), a first inlet port 24 and a first outlet port 25.

A second hydraulic unit 27 having a second input/output member 28 coupled through a shaft 60, a key 28', gears 30, 31 and a one-way clutch 29 to the second input/output shaft 14, a second reaction member 32 attached to the housing 11 by bolts 33 (one shown), a second inlet port 34 and a second outlet port 35.

A first band brake 36 selectively actuatable by a conventional servo system (not shown) for anchoring the first input/output shaft 13 to the housing 11 through a drum 36' attached to the shaft 13 by a key 61.

A second band brake 37 selectively actuable by a conventional servo system (not shown) for selectively anchoring the second input/output shaft 14 (which also serves as the housing of the differential 12).

An energy storage system 38 having an inlet-outlet port 39, consisting of a hydraulic accumulator 41 and a flywheel assembly 42 which are mutually connected by second hydraulic conduits 40 and valving means 40, and first hydraulic conduit and valving means consisting of conduits 44 and valving 45, for selectively establishing connections between the first inlet port 24, first outlet port 25, second inlet port 34, second outlet port 35 and inlet/outlet port 39, according to the mode of operation which is desired of the transmission 10.

OPERATION

Mechanical lock-up is accomplished by applying the first band brake 36, in this mode all the power is mechanically transmitted.

Hydraulic lock-up is accomplished by connecting, via the first conduit and valving means 45, the first outlet port 25 to the second inlet port 34 and setting the first hydraulic unit at a certain displacement per revolution (hereinafter called DPR for short), preferably maximum DPR, and setting the second hydraulic unit 27 at zero DPR. The brake 37 is released.

Hydromechanical forward reduction mode is accomplished by connecting the first outlet port 25 to the second inlet port 34 and setting the DPR of both hydraulic units 21 and 27 at a certain value, the relative size of which will determine the overall ratio of the transmission.

In this mode part of the power is transmitted through the one-way clutch 29 and gear mesh 30-31 with high efficiency, and the penalty of hydrostatic losses applies only to the part of the power which is converted to pressurized fluid flow.

Hydromechanical forward overdrive mode is accomplished by connecting the first inlet port 24 to the second inlet port 34 and connecting the first outlet port 25 to the second outlet port 35 (it should be noted that the names of the ports was coined in connection with their function in the previous, reduction mode, and these names shall be maintained throughout the text to avoid confusion) and setting the DPR of the first hydraulic unit 21 substantially larger than that of the second hydraulic unit 27. In this mode, as in the reduction mode, the power is split between the highly efficient mechanical branch, and the less efficient hydraulic branch. It should be noted that reversing the direction of flow in order to shift from the reduction mode to the overdrive mode can be internally accomplished with some commercially available hydraulic units, and if such an arrangement is utilized it is equivalent to externally switching the connection of ports as described above.

Hydromechanical reverse mode is accomplished by leaving the ports connected as in the overdrive mode and setting the DPR of the second hydraulic unit 27 to be substantially larger than the DPR of the first hydraulic unit 21.

Hydrostatic forward mode (intermittent optimal engine operation) is accomplished by actuating the second band brake 37 and thereby anchoring the second shaft 14 to the housing 11, while the one-way clutch 29 permits the free rotation of the gear mesh 30-31.

In this mode the first outlet port 25, the second inlet port 34 and the inlet/outlet port 39 are connected together. Intermittently, a control system 46 causes an engine 47 to start and run at an optimum power output level charging the energy storage system 38. When the system 38 is charged, the control 46 shuts the engine 47 and the car continues to move, accelerate, stop, power its accessories, etc. on energy stored in the energy storage system 38, until the stored energy is depleted to a certain pre-determined level, the control 46 restarts the engine and recharges the energy storage system 38. The hydrostatic mode is suitable and efficient for inner city driving.

Engine starting is accomplished by connecting the inlet/outlet port 39 to the first outlet port 25, thereby causing the first hydraulic unit 21 to crank the engine 47.

Regenerative braking is accomplished by connecting the second outlet port 35 to the inlet/outlet port 39 and causing the car wheels and drive axle 72 to drive the second hydraulic unit 27 and thereby convert and store the vehicle's kinetic energy in the energy storage system 38. The braking torque can be adjusted by varying the DPR of the second hydraulic unit 27.

During the lock-up modes and the hydromechanical modes the inlet/outlet port 39 can be connected to the hydraulic units' ports, either boosting the power output from the transmission 10, or for charging the energy storage system 38, depending on whether the pressure in the system 38 is above or below, respectively, the pressure prevailing between the hydraulic units 21 and 27.

The energy storage system 38 comprises the hydraulic accumulator 41 which typically contains an elastic element in the form of pressurized gas and the optional flywheel assembly 42 which extends the energy storage capacity of the system 38. The flywheel assembly 42 consists of the flywheel 50, a small hydraulic unit 49 which is coupled to the flywheel 50 through a clutch 48 and connected to the accumulator 41 through a second conduit and valving means 40 and 40'. When the pressure in the accumulator 41 passes a certain level the second conduit and valving means 40' couples the clutch 48, transfers and directs pressurized fluid to the hydraulic unit 49 which accelerates the flywheel 50, and thereafter disengages the clutch 48, leaving the flywheel 50 spinning.

When the pressure in the accumulator 41 drops below a certain level the direction of energy transfer reverses, the clutch 48 is reapplied, the flywheel 50 drives the hydraulic unit 49 which sends pressurized fluid through the conduit and valving means 40' into the accumulator 41. Thus the flywheel assembly acts as an extended energy storage capacity of the system 38 while the accumulator 41 handles the large surges of power during braking or acceleration which the transmission 10 exchanges with the system 38.

As previously mentioned, the flywheel assembly 42 represents an option, and in a vehicle where a limited energy storage capacity is sufficient, the accumulator 41 alone can be used as the complete energy storage system 38.

As shown in FIG. 1, the input/output shaft 15 serves as an input of the transmission 10 and it is mechanically connected (as represented by the dot-line) to an output shaft 71 of the engine 47.

The shaft 60 serves as the output of the transmission 10 and is mechanically connected to a drive axle 72, however, as with other transmissions the role of the shafts, 15 and 60 can be reversed.

While the present invention was illustrated by a single embodiment, it should be understood that modifications and substitutions can be made without departing from the scope of the claims and spirit of the invention.

I claim:

1. An automotive energy managing transmission comprising in combination:
    a housing,
    a differential having a first, a second and a third input/output shaft,
    a first hydraulic unit having a first input/output member coupled to said first input/output shaft, a first reaction member attached to said housing, a first inlet port and a first outlet port, a second hydraulic unit having a second input/output member coupled through a clutch to said second input/output shaft, a second reaction member attached to said housing, a second inlet port and a second outlet port, a first brake for selectively anchoring said first input/output shaft to said housing, a second brake for selectively anchoring said second input/output shaft to said housing, an energy storage means having an inlet/outlet port, first hydraulic conduit and valving means for selectively establishing connections between the said first inlet port, the said first outlet port, said second inlet port, said second outlet port and said inlet/outlet port.

2. A transmission as in claim 1, adapted to transmit power mechanically when said first brake is applied, and said clutch is engaged.

3. A transmission as in claim 1 adapted to transmit power hydrostatically when said second brake is applied, and said clutch is disengaged.

4. A transmission as in claim 1 wherein said clutch is a one-way clutch.

5. A transmission as in claim 1, wherein said energy storage means comprise an accumulator.

6. A transmission as in claim 1, wherein said energy storage means comprise an accumulator and a flywheel coupled to an input/output member of a hydraulic unit through a selectively actuatable clutch, said hydraulic unit and said accumulator being connected to one another by a second conduits and valving means.

* * * * *